A. RUST.
Car-Couplings.

No. 147,865. Patented Feb. 24, 1874.

Witnesses:
E. Wolff
Sedgwick

Inventor:
A. Rust
Per
Attorneys.

UNITED STATES PATENT OFFICE.

ABRAHAM RUST, OF VACA, CALIFORNIA.

IMPROVEMENT IN CAR-COUPLINGS.

Specification forming part of Letters Patent No. 147,865, dated February 24, 1874; application filed September 20, 1873.

*To all whom it may concern:*

Figure 1:
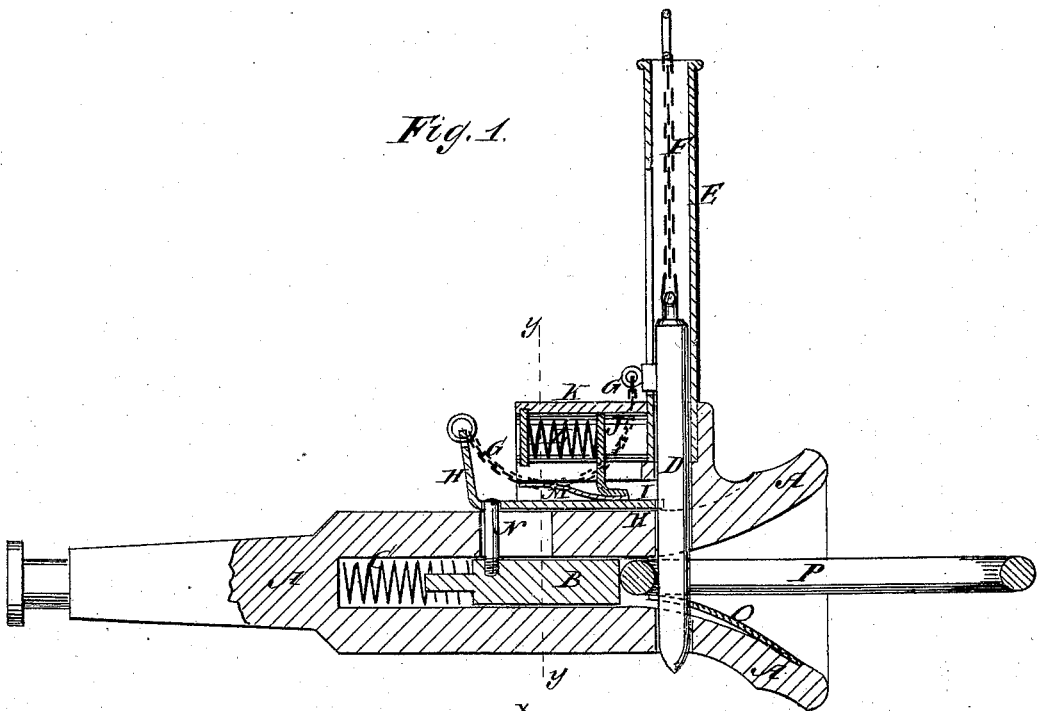
Figure 2:
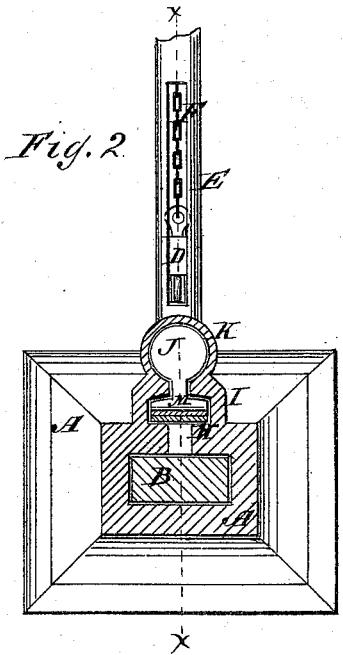

Be it known that I, ABRAHAM RUST, of Vaca, in the county of Solano and State of California, have invented a new and useful Improvement in Car-Coupling, of which the following is a specification:

Figure 1 is a vertical longitudinal section of my improved car-coupling, taken through the line *x x*, Fig. 2. Fig. 2 is a vertical cross-section of the same, taken through the line *y y*, Fig. 1.

Similar letters of reference indicate corresponding parts.

My invention has for its object to furnish an improved car-coupling, simple in construction and convenient in use, being so constructed as to couple the cars automatically as they are run together, and which may be uncoupled while the cars are standing close together. The invention consists in the combination of parts as hereinafter described, and specifically indicated in the claim.

A represents the bumper-head, the inner part of which is secured to the frame-work of the car in the ordinary manner. The mouth of the bumper A is made hopper-shaped, to guide the entering-link into place. The cavity of the bumper A is extended inward, and into it is fitted a sliding block, B, which is forced and held forward by a coiled spring, C, the forward end of which rests against the rear or inner end of the block B, and its inner end rests against the end of the said cavity, as shown in Fig. 1. D is the coupling-pin, which passes vertically through a hole in the forward part of the bumper A, and moves up and down through a tube, E, which may be of any desired length, and the lower end of which is securely and rigidly attached to the upper side of the bumper A. To the upper end of the coupling-pin D is attached a chain, F, which passes out through the open upper end of the tube E, and by means of which the coupling-pin D is raised in uncoupling the cars. To the rear side of the upper part of the coupling-pin D is attached, or upon it is formed, a lug, which projects through a slot in the rear side of the tube E, and to which is attached the upper end of the short chain G, the lower end of which is attached to the rear or inner end of the slide H, which slides in a recess, I, upon the upper side of the bumper A, so that its forward end may pass beneath the lower end of the tube E, to support the pin D when raised to uncouple the cars. To the slide H is attached an arm, J, which projects upward into a recess, K, formed above the recess I. In the rear part of the recess I is placed a coiled spring, L, the forward end of which rests against the arm J, to throw the slide H forward when released. M is a spring, attached to the slide H, the free end of which rests against the under side of the recess K, to hold the slide H down to its place. In the rear part of the slide H is formed a hole to receive the upper end of a pin, N, which passes down through a slot in the upper part of the bumper A, and its lower end is attached to the sliding block B. O is a spring-plate, placed upon the inclined upper surface of the lower part of the mouth of the bumper A. The inner part of the spring-plate O rests against the under side of the link P, to hold it in a horizontal position, so that it will certainly enter the bumper-head of the adjacent car, as the cars are run together.

As the pin D is raised to uncouple the cars by means of the chain F, the rear end of the slide H is raised from the pin N by the chain G, allowing the said slide H to be pushed forward by the spring L, beneath the coupling-pin D, to support said coupling-pin. As the link P is withdrawn from the bumper-head, the sliding block B is pushed forward by the spring C, so that the pin N may again enter the hole in the slide H, and the coupling is arranged to couple automatically as the cars are run together. As the cars are run together the entering-link P pushes back the block B, which carries the slide H with it, allowing the coupling-pin D to drop into place through the link P, coupling the cars.

Having thus described my invention, I claim as new and desire to secure by Letters Patent—

The combination of plate H, spring M, slotted cylinder containing spring L, chain G, pin D, sliding block B, and pin N, to work in slot of draw-head, as shown and described, to operate as specified.

ABRAHAM RUST.

Witnesses:
J. H. BARRETT
JESSE RUST.